United States Patent [19]

Hahn

[11] Patent Number: 4,819,770

[45] Date of Patent: Apr. 11, 1989

[54] HYDRAULIC CONTROL DEVICE

[75] Inventor: Norbert Hahn, South Milwaukee, Wis.

[73] Assignee: Rite-Hite Corporation, Milwaukee, Wis.

[21] Appl. No.: 108,262

[22] Filed: Oct. 13, 1987

Related U.S. Application Data

[63] Continuation-in-part of Ser. No. 65,261, Jun. 22, 1987, abandoned.

[51] Int. Cl.4 ............................................. F16F 9/48
[52] U.S. Cl. ..................................... 188/284; 188/286; 188/288; 188/322.19
[58] Field of Search .................... 188/284, 286, 288, 316, 188/318, 322.19; 16/51

[56] References Cited

U.S. PATENT DOCUMENTS

| 1,320,060 | 10/1919 | Jenney | 188/288 |
| 1,567,515 | 12/1925 | Kijima et al. | 188/288 |
| 2,604,953 | 7/1952 | Campbell | 188/286 |
| 2,710,077 | 6/1955 | Fabel et al. | 188/288 |
| 3,062,331 | 11/1962 | Wyman | 188/288 |
| 3,605,960 | 9/1971 | Singer | 188/318 |
| 3,913,901 | 10/1975 | Molders | 188/284 X |
| 3,991,863 | 11/1976 | Lee | 188/318 X |
| 4,106,412 | 8/1978 | Farris et al. | 188/286 X |
| 4,307,875 | 12/1981 | Schnitzius et al. | 188/288 |

FOREIGN PATENT DOCUMENTS

| 154924 | 11/1938 | Austria | 188/318 |
| 154924 | 11/1938 | Fed. Rep. of Germany | 188/318 |
| 2659281 | 7/1978 | Fed. Rep. of Germany | 188/286 |
| 284062 | 1/1928 | United Kingdom | 188/318 |
| 458311 | 12/1936 | United Kingdom | 188/318 |

Primary Examiner—George E. A. Halvosa
Attorney, Agent, or Firm—Neuman, Williams, Anderson & Olson

[57] ABSTRACT

A hydraulic device is provided for controlling the rate of relative movement of first and second members between predetermined first and second stations. The device includes a housing connected to the first member and provided with a first cavity for hydraulic fluid and a second cavity for hydraulic fluid segregated from the first cavity. The first cavity has adjacent first and second segments with the second segment having a greater cross-sectional area. An orifice is disposed adjacent an end portion of the first cavity first segment which is remote from the second segment and interconnects the cavities. A valve is remote from the orifice and permits restricted hydraulic fluid flow from the first cavity to the second cavity and substantially unrestricted hydraulic fluid flow from the second cavity to the first cavity. The direction of flow through the valve depends upon the direction of movement of a piston mounted for reciprocatory movement within the first cavity. The piston is connected to the second member and is provided with a head section which is adapted to be in sliding sealing engagement with only the first cavity first segment.

12 Claims, 2 Drawing Sheets

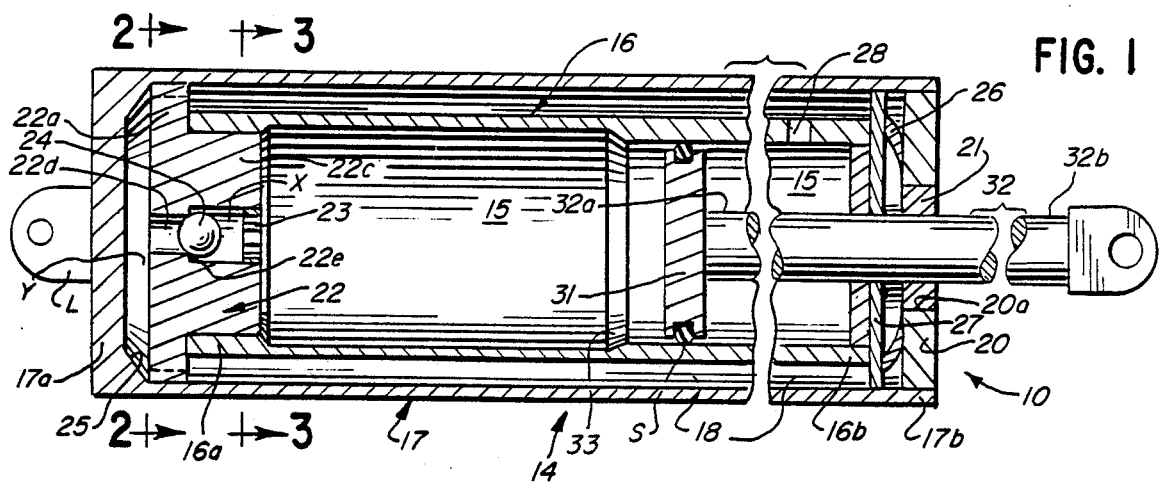
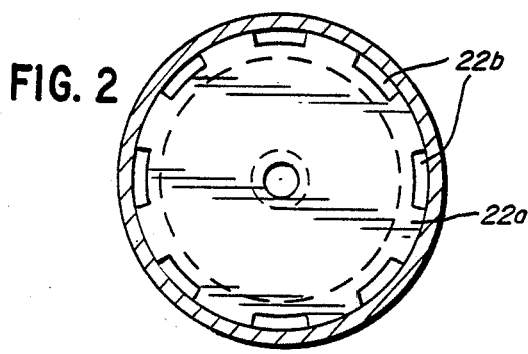
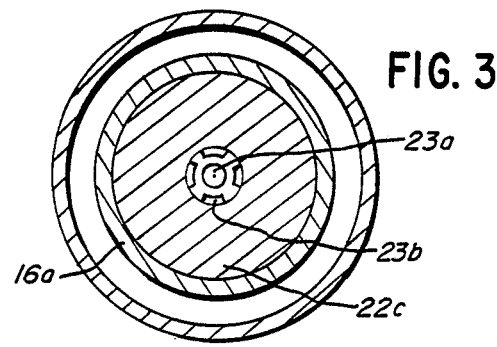
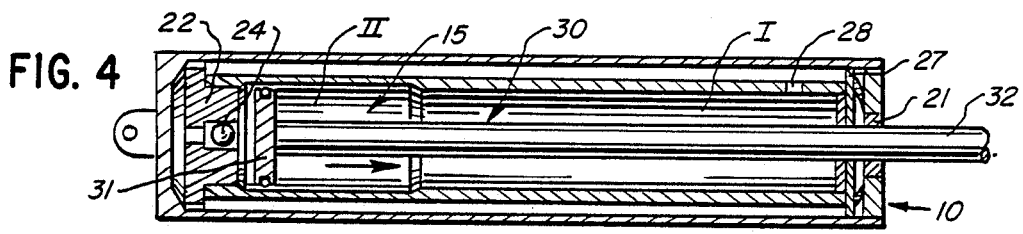
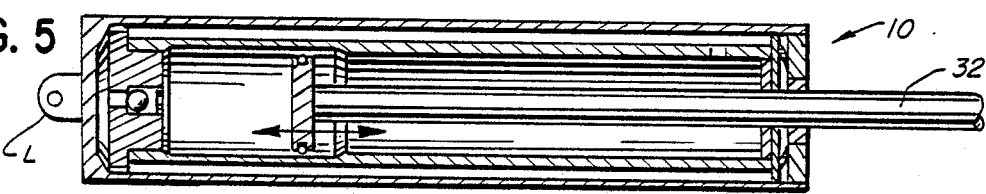
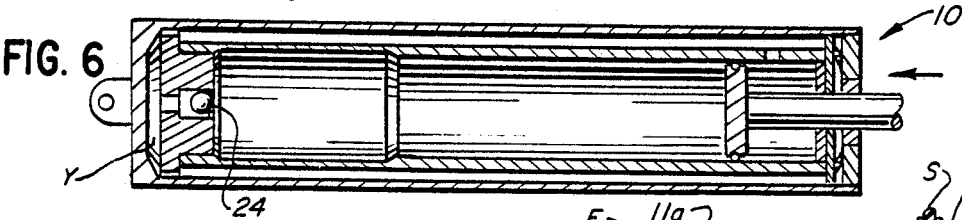
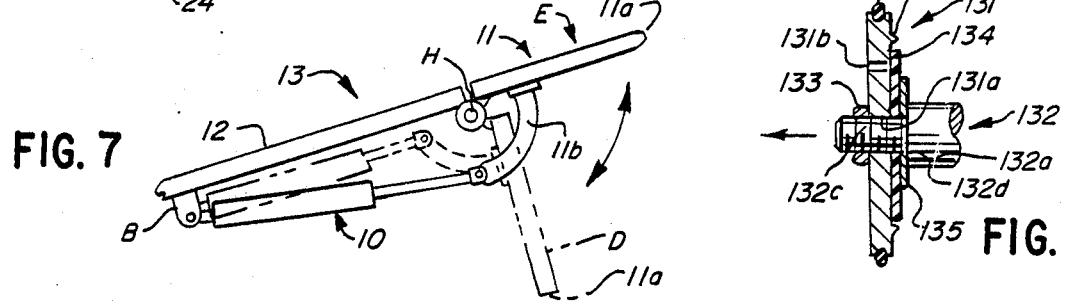

HYDRAULIC CONTROL DEVICE

This application is a continuation-in-part of the copending application, Ser. No. 065,261, entitled A Hydraulic Control Device, filed June 22, 1987, now abandoned.

BACKGROUND OF THE INVENTION

Heretofore, various devices have been utilized to control the rate of relative movement between first and second members. Such devices, however, are particularly useful in loading dock equipment such as dock levelers. A conventional dock leveler compensates for the height differential which might occur between the dock platform and the bed of a vehicle while parked at the loading dock for loading or unloading thereof. The dock leveler is mounted within a pit formed in the dock platform and has an open top and an open front side, the latter being disposed at the front wall of the dock adjacent the parked vehicle. The leveler includes a heavy dockboard which overlies the pit open top and is hingedly connected to the dock adjacent the rear wall of the pit. Hingedly connected to the front edge of the dockboard, which is adjacent the pit open front side, is an extension plate. The plate is adapted to move relative to the dockboard front edge between a depending inoperative position and an extended operative position. When the extension plate is in its operative position, it is extending outwardly from the dockboard front edge and may be substantially coplanar with the upper surface of the dockboard and rest upon and be supported by the upper surface of the bed of the parked vehicle. Thus the extended extension plate spans the gap which is formed between the rear edge of the vehicle bed and the front edge of the dockboard.

To move the extension plate from a depending inoperative position to an extended position normally requires the dockboard to be pivoted upwardly a sufficient amount whereby the extension plate can swing outwardly by some independent force to the extended position without obstruction from the parked vehicle. Once the extension plate has cleared the parked vehicle, the dockboard and extended extension plate are pivoted downwardly as a unit until the extended extension plate rests upon the vehicle bed. After loading or unloading of the parked vehicle has been completed, the vehicle is moved away from the dock causing the extension plate to assume its depending position. It is important that the extension plate assumes its proper depending position whereby the dockboard is supported thereby in a horizontal coplanar relation, or cross-traffic position, with the dock platform. When the dockboard is being supported by the depending extension plate the latter engages stationary lugs or cleats protruding from the dock front wall.

Because the extension plate normally relies on gravitational force to move from the extended position to the fully dependent position, difficulty has heretofore been frequently encountered in having sufficient gravitational force to move the extension plate the necessary amount after the plate has pivoted through a predetermined sector (i.e. the first half of its downward travel). To prevent premature pivotal movement of the extension plate from its extended position before it is brought into supporting engagement with the bed of the parked vehicle, a hydraulic device similar to a shock absorber was utilized for this purpose.

Such prior devices utilized for this purpose were beset with one or more of the following shortcomings: (a) to achieve sufficient falling time of the plate during the first half to its downward pivoting motion of the device could not prevent the extension plate from becoming hung up in a partially extended position due to loss of gravitational force of the plate thereby preventing the dockboard from being properly supported in a cross-traffic position by the extension plate; (b) the device was highly susceptible to malfunction; (c) the device was difficult and awkward to install and maintain in proper working order; and (d) the device would not function properly under extreme climatic conditions.

SUMMARY OF THE INVENTION

Thus, it is an object of the invention to provide a hydraulic device which is not beset with any of the aforesaid shortcomings.

It is a further object to provide a device which is of simple inexpensive construction and utilizes a minimum number of component parts.

It is a further object to provide a hydraulic device which may be readily installed on existing docklevelers which vary over a wide range in size and shape.

It is a still further object to provide an improved hydraulic device which will automatically control changes in the rate of relative movement between two members.

It is a still further object to provide an improved hydraulic device wherein the piston head is effectively stabilized and guided throughout its stroke within the hydraulic cylinder.

Further and additional objects will become apparent from the description, accompanying drawings and appended claims.

In accordance with one embodiment of the invention, a hydraulic device of the type described is provided which includes a housing connected to a first member and a piston connected to a second member and mounted for reciprocatory movement within a first cavity disposed within the interior of the housing. Also dipsosed within the housing interior is a second cavity segregated from the first cavity. Both cavities are filled with hydraulic fluid. One end portion of the first cavity is provided with a first means which effects interconnection between the first and second cavities. A second means is provided at the opposite end portion of the first cavity and permits minimal hydraulic fluid flow from the first cavity to the second cavity during a predetermined portion of relative movement of the piston away from the first means. During a predetermined portion of relative movement of the piston in the opposite direction, the second means permits maximum hydraulic fluid flow from the second cavity to the first cavity. The interior of the first cavity includes adjacent first and second segments. The cross-sectional area of the first segment is less than that of the second segment. The piston is provided with a head portion which is adapted to be in sliding sealing engagement with only the interior surface of the first segment of the first cavity.

DESCRIPTION

For a more complete understanding of the invention reference should be made to the drawings wherein:

FIG. 1 is an enlarged fragmentary sectional view of one embodiment of the improved hydraulic device taken along the longitudinal centerline thereof.

FIG. 2 is an enlarged sectional view taken along line 2—2 of FIG. 1.

FIG. 3 is similar to FIG. 2 but taken along line 3—3 of FIG. 1.

FIGS. 4-6 are schematic diagrams of the improved device showing the piston in various relative positions within the housing first cavity.

FIG. 7 is a fragmentary side elevational view showing the device of FIG. 1 mounted on a dock-leveler and having the device housing connected to the underside of a dockboard and the device piston connected to an extension plate; the dockboard in a raised position and the extension plate is an extended position are shown in full lines; the extension plate in a depending position and the device in a changed position being shown in phantom lines.

FIG. 8 is an enlarged fragmentary vertical sectional view of a modified piston.

Figure 9:
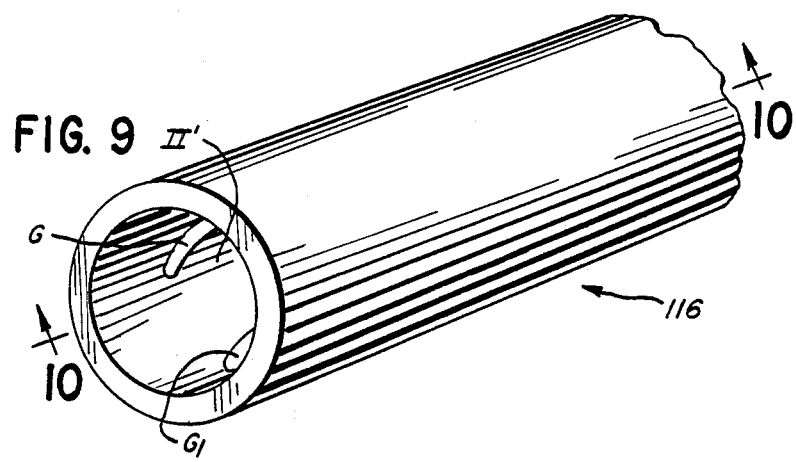

FIG. 9 is a fragmentary perspective left end view of a modified inner tubular member, the latter comprising a component of the improved hydraulic device.

Figure 10:
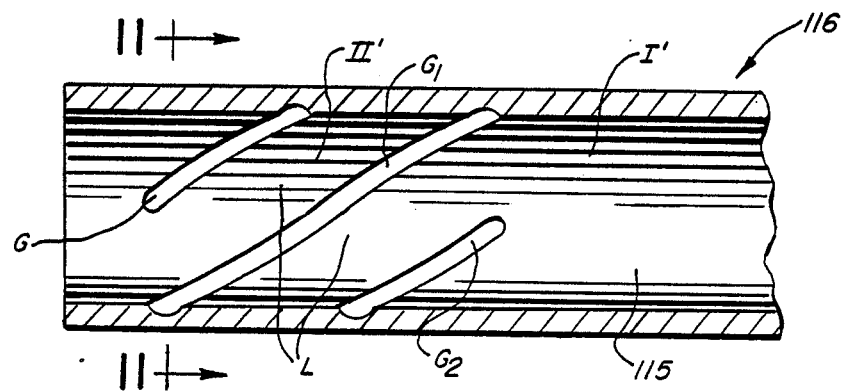

FIG. 10 is a fragmentary sectional view taken along line 10—10 of FIG. 9.

Figure 11:
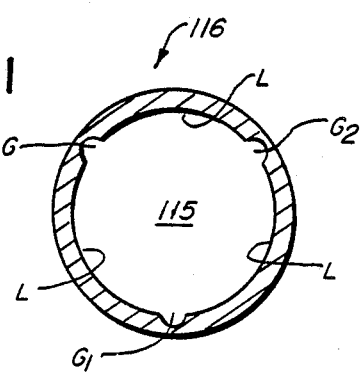

FIG. 11 is a sectional view taken along line 11—11 of FIG. 10.

Referring now to the drawings and more particularly to FIG. 1, a preferred embodiment of the improved hydraulic device 10 is shown which is adapted to control changes in the rate of relative movement of one member 12 with respect to a second member 11. As shown in FIG. 7, the device is installed in a conventional dock-leveler 13 wherein an extension plate (second member) 11 is hingedly connected to the front edge of a dockboard (first member) 12. The dockboard 12 is of conventional design and has a rear edge thereof hingedly connected to a rear wall of a pit, not shown, formed in the platform, or top surface, of a loading dock to accommodate components of the dock-leveler. The dock-leveler 13 is a well known apparatus utilized in loading docks to compensate for height variations which occur between the dock platform and the bed of a vehicle parked at the loading dock for loading and unloading.

The extension plate 11, when in its extended position E wherein the included angle between the dockboard and plate is approximately 180° C., is adapted to have the free edge portion 11a thereof rest upon the bed of the parked vehicle when the dockboard is pivoted downwardly from its fully raised position. Thus, the extended extension plate spans a gap formed between the dock front wall and the rear end of the bed, when the vehicle is secured in a parked position. The operation of the device when installed in a dock-leveler will be described more fully hereinafter.

Device 10, as illustrated in FIG. 1, includes a housing 14 which is provided with a lug L at one end, which in turn, as shown in FIG. 7, is pivotally connected to a depending bracket B fixedly connected to the underside of the dockboard 12. The bracket B is spaced inwardly a predetermined distance from the hinge H interconnecting the extension plate 11 to the front edge of the dockboard.

Formed within the interior of the housing 14 is a first cavity 15 defined by an inner tubular member 16. The exterior surface of member 16 is spaced from the interior surface of an encompassing outer tubular member 17 and coacts therewith to form a second cavity 18. The left end 17a of the outer member 17, as seen in FIG. 1, is closed and the lug L protrudes therefrom. Affixed to the opposite, or right, end 17b of the outer member is a closure piece 20. The center of piece 20 is provided with an opening 20a in which is disposed an annular rod seal 21.

The left end 16a of the inner tubular member 16 is provided with a closure element 22. The element 22 has an outwardly extending flange 22a which may be provided with a plurality of circumferential, symmetrically arranged openings 22b, see FIG. 2, through which hydraulic fluid is adapted to flow between cavities 15 and 18, as will be described more fully hereinafter. The element 22 is provided with a central portion 22c which is sized so as to snugly fit within the left end of the tubular member 16. The central portion 22c is provided with a central passage 22d. The left end portion of the passage is reduced in size providing an internal ledge 22e. Affixed to the right end of passage 22d is an annular retainer 23 which is spaced from and coacts with ledge 22e to form a space X in which is confined a ball-shaped valve piece 24. The ball piece 24 is free to move within the space X between the ledge 22e and the retainer 23 in response to the pressure exerted thereon by the hydraulic fluid when it flows between cavities 15 and 18. The retainer 23, as seen in FIGS. 1 and 3, includes a central opening 23a and a plurality of circumferential, symmetrically arranged openings 23b through which the hydraulic fluid will flow when the ball piece 24 is engaging the retainer 23. The latter situation occurs when the hydraulic fluid is flowing from cavity 18 to cavity 15.

When ball piece 24 is engaging ledge 22e here is a small amount of leakage of the hydraulic fluid past the ball piece from cavity 15 to cavity 18 due to the manufacturing tolerances or the like. Various other types of valves may be utilized in place of the wall type herein described. In any case the valve should be capable of permitting substantial flow of hydraulic fluid in one direction and very limited flow in the opposite direction for reasons to be discussed more fully hereinafter.

It will be noted in FIG. 1 that the outer periphery of flange 22a of closure element 22 engages a chamfered shoulder 25 located adjacent the left end of cavity 18, thus causing the endface of closure element 22 to be spaced from the closed end 17a of the outer tubular member 17 thereby forming a narrow circular passage Y communicating with cavity 18 and the passage 22d of closure element 22. Engagement between flange 22a and shoulder 25 is maintained by a spring washer 26 which is interposed the closure piece 20 affixed to the right end 17b of tubular member 17 and a closure cap 27 affixed to the right end 16b of the inner tubular member 16, see FIG. 1. Cap 27 projects laterally beyond the outer surface of the tubular member 16 and engages the interior surface of outer tubular member 17. Thus, in addition to closing off the tubular member end 16b, the cap 27 also acts as a spacer so as to maintain the desired configuration of cavity 18.

Formed in the tubular member and end 16b and adjacent to, but spaced from the cap 27 is an orifice 28 of fixed dimension. The orifice provides continuous communication between the corresponding ends of cavities 15 and 18. The size of the orifice is such that the hydraulic fluid flow therethrough will correspond substantially to the desired maximum flow of the hydraulic fluid from cavity 18 to cavity 15 past the ball valve piece 24.

As seen more clearly in FIGS. 4-6, cavity 15 is formed of two segments I and II. Segment I, which is adjacent cap 27, has a smaller inside diameter, or cross-sectional area, than segment II, which is adjacent closure element 22.

Mounted for relative movement within cavity 15 is a piston 30. The piston 30 includes a head portion 31 which is confined within cavity 15, and a rod 32 connected at one end 32a to the head portion and having the other end 32b exposed and pivotally connected to an arm 11b affixed to the underside of the extension plate 11, see FIG. 7. Rod 32 is in sliding sealing engagement with the seal 21 carried by closure piece 20.

Head portion 31 is provided with a circumferential groove in which is disposed an O-ring or similar seal S. The head portion is sized so that when there is relative movement of the head portion in the first segment I of cavity 15, the seal will be in sliding sealing engagement with the interior surface of tubular member 16 defining segment I, see FIG. 6. On the other hand, when the head portion is located in segment II, see FIG. 5, the seal will be disengaged from the interior surface, thereby enabling the piston head to move relatively rapidly in either direction.

When the piston head 31 is positioned within cavity segment II, as shown in FIG. 4, the extension plate 11 is in its depending or right angle position D relative to the dockboard 12 as shown in phantom lines in FIG. 7. When the dockboard is pivoted downwardly to a horizontal position while the extension plate 11 is disposed in its depending position D, the lower, or free, edge 11a of the plate will engage fixed brackets or cleats, not shown, mounted on the front wall of the dock thereby causing the dockboard to be supported by the depending extension plate in the horizontal position. While in the horizontal position, cross traffic may move safely across the dockboard because the exposed surface of the dockboard is flush with the dock platform surface.

In lieu of the closure element 22, retainer 23, and ball piece 24 combination as aforedescribed, a conventional one way valve may be substituted therefor wherein there is substantially no, or minimal, leakage of the hydraulic fluid past the valve from cavity 15 to cavity 18. When such a one way valve is employed, a modified piston head 131 of the type shown in FIG. 8 may be utilized. Head 131 is provided with a central opening 131a through which extends a reduced, externally threaded stud-like portion 132c formed on the end 132a of the piston shaft or rod 132. The head 131 is attached to the shaft end 132a by a nut 133 which is threaded onto the stud-like portion 132c. Radially offset from the central opening 131a is a small opening 131b. Overlying the end of opening 131b, which faces cap 27 is a flexible washer 134. The exposed surface of the flexible washer 134 is engaged by a small inflexible washer 135. Thus, the piston head 131, and washers 134, 135 are held in place between nut 133 and a shoulder 132d formed in shaft 132. A small rib 131c may be formed on the surface of the piston head 131 engaged by washer 134. The rib is in encompassing spaced relation with the outer periphery of flexible washer 134 and prevents lateral shifting of the washer.

Thus, when the piston head 131 is disposed within cavity segment I and is moving towards segment II, the hydraulic fluid captured within the portion of the cavity 15 between the piston head 131 and the left end 16a of tubular member 16 will force the outer peripheral portion of flexible washer 134 to be distorted so as to uncover the end of opening 131b allowing the hydraulic fluid to flow through the opening 131b from the left side to the right side of the head portion as seen in FIG. 8. The flow rate of the hydraulic fluid through the opening 131b determines the speed that the extension plate 11 pivots in a clockwise direction from its extended position E through an arc of approximately 45°.

Device 10 does not initiate movement of the extension plate 11 to its extended position but relies upon an independent power souce, not shown, which may be hydraulically, pneumatically or electrically actuated. For initiating movement of the plate from its extended to depending positions, gravitational force is normally utilized. The type of force utilized in either case and the manner in which the force is applied to the extension plate, or the means for initiating movement of the dockboard itself form no part of the invention herein disclosed and claimed.

As previously mentioned, the principal function of the improved device 10 is to control the charge in the rate of relative movement between member 11 (e.g., extension plate) and member 12 (e.g., dockboard).

When the plate 11 is to be moved from the depending position D to the extended position E to accommodate the bed of a parked vehicle, the dockboard 12 is power actuated to pivot upwardly from its cross-traffic, horizontal position to an upwardly inclined position of approximately 45°. Once the dockboard has reached such inclined position, the extension plate 11 will be automatically powered to its extended position E. When this occurs the piston head portion 31 will move rapidly from its position adjacent closure element 22, see FIG. 4, in the direction of the arrow until it reaches a position adjacent orifice 28, see FIG. 6. When the piston head portion 31 approaches cavity segment I and if it should be slightly off center, the seal 32 will engage an internal beveled shoulder 33 formed within cavity 15 at the juncture of the two segments causing the piston head portion to become self-aligned with segment I whereby the seal 32 will slidably and sealingly engage the cavity wall defining segment I. Because of the size of the orifice 28 and passage 22d the movement of the head portion 31 towards the orifice will not be impeded to any appreciable extent by hydraulic pressure within segment I.

The upwardly inclined dockboard and the extended extension plate 11 are then pivoted downwardly as a unit until the plate 11 engages the upper surface of the bed of the parked vehicle. Once the loading or unloading of the parked vehicle has been completed and the vehicle has moved away from the loading dock the dockboard will temporarily remain stationary while the extension plate 11 pivots to its depending position D. If the piston head 31 or 131 is disposed within cavity segment I at the time the vehicle moves away from the dock, the initial pivoting movement of plate 11 will be slow until the piston head reaches cavity segment II at which point the pivoting movement of the plate will be rapid. Thus, the device 10 prevents the extended plate 11 from becoming hung-up in an unsupported extended position. This change in rate of relative movement of the piston head is due to the fact that when the piston head is in segment II, the hydraulic fluid may readily flow around the periphery of the head portion and out through orifice 28 into cavity 18. Once the plate has reached its depending position, the dockboard 12 will pivot downwardly with the depending plate until the depending plate 11 engages the fixed brackets or cleats disposed on the front wall of the dock whereupon the dockboard is properly supported in a crosstraffic position.

A modified inner tubular member 116 is shown in FIGS. 9–11 which may be substituted for tubular member 16 shown in FIG. 1. Member 116 is provided with an interior cavity 115 formed into two segments I' and II'. Segment I of cavity 15 and segment I' of cavity 115 are of like configuration. Segment II', however, is provided with one, or more, symmetrically arranged internal grooves G, $G_1$ and $G_2$ formed in the surface of cavity 15 defining segment II'. Thus, by reason of the surface grooves, segment II' of cavity 115 has a greater cross-sectional area than that of segment I'. The grooves extend substantially the full length of segment II' and are of such size and shape, that substantial hydraulic fluid will flow therethrough past the periphery of the piston head 31 as the latter is moving longitudinally within segment II'. It is preferred that the groove, or grooves, be curvilinear. In order to effect uniform wear on the piston seal S, the curvature of each groove will equal 360° divided by the number of grooves formed in the surface of cavity segment II'. For example, where there is only one groove, its curvature is 360°; where however there are three grooves, each groove has a curvature of 120°.

The surface portions L of segment II', intermediate the grooves, remain in sliding engagement with the periphery of the piston head 31 or 131 and guide the latter as it moves through segment II'. In addition to guiding the piston head, the portions L enhance the stability of the piston as it moves longitudinally of the tubular member 116. The number, curvature and arrangement of the grooves may vary from that shown without departing from the scope of the invention. Thus, as the piston head is moving longitudinally of cavity segment II' it is not in sealing engagement with the cavity forming surface of segment II'.

While the improved device has been described in relation to a dock-leveler it is not intended to be limited thereto, but may be utilized in other apparatus wherein the rate of relative movement of one member to a second member changes significantly during relative movement of the members in one predetermined direction.

The improved device is of simple, durable and inexpensive construction, utilizes a minimal number of component parts, is easy to install, and requires a minimal amount of service.

I claim:

1. A hydraulic device for controlling changes in the rate of relative movement of first and second members between predetermined first and second stations, said device comprising a housing adapted to be connected to the first member, said housing including an interior elongated cylindrical first cavity for hydraulic fluid, and a second cavity for hydraulic fluid segregated from said first cavity, said first and second cavities being substantially filled with hydraulic fluid, said first cavity being provided with contiguous first and second segments, the first segment having a smaller cross-sectional area than the second segment; said contiguous first and second segments providing a substantially abrupt change in crosssectional area of said first cavity; first means disposed adjacent one end portion of said first cavity first segment remote from said second segment and allowing a first predetermined flow of hydraulic fluid between said cavities during predetermined portions of relative movement of the first and second members; a piston mounted for reciprocatory movement within said first cavity, said piston having an exposed portion adapted to be connected to the second member, and a concealed head portion in sliding sealing engagement with only the first segment of the first cavity during said predetermined portions of relative movement of the first and second members; and second means remote from said first means and effecting a second predetermined flow of hydraulic fluid from the first cavity to the second cavity during a predetermined portion of relative movement of the first and second members from the first station to the second station, said second means effecting a third predetermined flow of hydraulic fluid from the second cavity to the first cavity during a predetermined portion of relative movement of the first and second members from the second station to the first station; said first means and second means coacting to appreciably impede by hydraulic pressure movement of said concealed head portion only during movement of the latter in said first segment of said first cavity in a direction towards said second segment.

2. The combination of a pair of hingedly connected first and second members, and a hydraulic device for controlling changes in the rate of relative hinged movement of the first and second members between predetermined first and second stations of hinged adjustment; when in said first station said first and second members defining an included angle which is less than when said members are in said second station; said device comprising a housing connected to one of the members and provided with an interior elongated cylindrical first cavity for hydraulic fluid, and a second cavity, said first and second cavities being substantially filled with hydraulic fluid, said first cavity having contiguous first and second segments, the first segment having a smaller cross-sectional area than the second segment; said contiguous first and second segments providing a substantially abrupt change in cross-sectional area of said first cavity; first means disposed adjacent an end portion of the first segment remote from the second segment and allowing flow of the hydraulic fluid between said cavities during predetermined portions of relative movement of said members towards and away from one of said stations; second means remote from said first means and effecting different rates of hydraulic fluid flow between the cavities depending upon the direction of relative movement of the first and second members; and a piston connected to the other of the members and mounted for reciprocating movement within the housing first cavity, said piston having a head portion adapted to be in sliding sealing engagement with a wall defining the first segment of the housing first cavity only when said first and second members are in said predetermined portions of relative movement; said first means and second means coacting to appreciably impede by hydraulic pressure movement of said concealed head portion only during movement of the latter in said first segment of said first cavity in a direction towards said second segment.

3. The hydraulic device of claim 1 wherein the first means comprises an orifice of fixed dimension.

4. The hydraulic device of claim 3 wherein the second means comprises a valve wherein the hydraulic fluid flow rate therethrough is substantially greater when the flow is from the second cavity to the first cavity than when the flow therethrough is from the first cavity to the second cavity.

5. The hydraulic device of claim 4 wherein the relative movement of the piston head portion within the first cavity first segment is the greatest when the hydraulic fluid flow through the valve is from the second cavity to the first cavity.

6. The hydraulic device of claim 1 wherein, when the piston head portion is disposed within the second segment of the first cavity, the periphery of the head portion is in substantially spaced relation with a wall defining said cavity second segment.

7. The hydraulic device of claim 1 or 2 wherein the second segment of the first cavity has a cavity forming surface thereof provided with at least one groove through which hydraulic fluid flows when the piston head portion moves longitudinally of the second segment.

8. The hydraulic device of claim 7 wherein the groove is curvilinear.

9. The hydraulic device of claim 8 wherein the curvature of a groove is equal to 360° divided by the number of grooves provided in the cavity-forming surface.

10. The hydraulic device of claim 1 or 2 wherein the second segment of the first cavity has a cavity-forming surface thereof provided with a plurality of symmetrically arranged cuvilinear grooves through which hydraulic fluid flows when the piston head portion moves longitudinally of the second segment; the portions of the cavity-forming surface intermediate the grooves being slidably engaged by the piston head when the latter is moving longitudinally of the second segment. encompassing relation with respect to said first tubular section, the interior surface of said second tubular section coacting with the exterior surface of said first tubular section to define said second cavity; the first and second cavities being continuously interconnected by the first means.

11. The combination of claim 10 wherein the rate of hydraulic fluid flow through the second means is substantially greater when the piston head section is moving in the first cavity first segment in a direction away from said second segment than when said head section is moving in the opposite direction.

12. The combination of claim 10 wherein the housing comprises a first tubular section defining said first cavity, and a second tubular section in spaced.

* * * * *

UNITED STATES PATENT AND TRADEMARK OFFICE
CERTIFICATE OF CORRECTION

PATENT NO. : 4,819,770

DATED : April 11, 1989

INVENTOR(S) : Norbert Hahn

It is certified that error appears in the above-identified patent and that said Letters Patent is hereby corrected as shown below:

IN THE SPECIFICATION:

Column 4, line 31, "here" should read --there--.
Column 4, line 35, "wall" should read --ball--.
Column 6, line 18, "charge" should read --change--.
Column 7, line 10, "15" should read --115--.

IN THE CLAIMS:

In Claim 10, cancel from "encompassing" in column 10, line 8 to "means." in column 10, line 13. In Claim 11, line 14, "10" should read --2--. Cancel existing Claim 12 and replace with the following:

12. The combination of Claim 2 wherein the housing comprises a first tubular section defining said first cavity, and a second tubular section in spaced encompassing relation with respect to said first tubular section, the interior surface of said second tubular section coacting with the exterior surface of said first tubular section to define said second cavity; the first and second cavities being continuously interconnected by the first means.

Signed and Sealed this

Thirty-first Day of October, 1989

*Attest:*

DONALD J. QUIGG

*Attesting Officer*  *Commissioner of Patents and Trademarks*